United States Patent
Kreiner et al.

[11] Patent Number: 6,138,450
[45] Date of Patent: Oct. 31, 2000

[54] ROCKET ENGINE WITH INTEGRAL COMBUSTION CHAMBER STEP STRUCTURE AND ITS FABRICATION

[75] Inventors: Kurt Kreiner, Hawthorne; David Bronson, Manhattan Beach, both of Calif.

[73] Assignee: Hughes Electronics Corporation, El Segundo, Calif.

[21] Appl. No.: 09/076,031

[22] Filed: May 11, 1998

[51] Int. Cl.$^7$ ..................................................... F02K 9/60
[52] U.S. Cl. ............................................................... 60/257
[58] Field of Search ....................................... 60/257, 259

[56] References Cited

U.S. PATENT DOCUMENTS

| | | | |
|---|---|---|---|
| 3,085,393 | 4/1963 | Hamlin, Jr. | 60/35.3 |
| 4,841,724 | 6/1989 | Hall et al. | 60/245 |
| 4,917,968 | 4/1990 | Tuffias et al. | 428/521 |
| 5,572,865 | 11/1996 | Sackheim et al. | 60/260 |
| 5,613,299 | 3/1997 | Ring et al. | 29/890.01 |
| 5,893,266 | 4/1999 | Smith et al. | 60/251 |

*Primary Examiner*—Timothy S. Thorpe
*Assistant Examiner*—Ehud Gartenberg
*Attorney, Agent, or Firm*—T. Gudmestad; M. W. Sales

[57] ABSTRACT

A rocket engine is prepared by fabricating a combustion chamber having an annular wall as a single piece of material. The wall has a first axial region with a first inner diameter, a second axial region with a second inner diameter greater than the first inner diameter, and an inner wall step transition between the first axial region and the second axial region. The combustion chamber is attached to an injector by bonding an annular metallic deposit to the first axial region of the combustion chamber, providing an annular adaptor ring, first welding the adaptor ring to the metallic deposit, and second welding the adaptor ring to the injector.

10 Claims, 3 Drawing Sheets

ROCKET ENGINE WITH INTEGRAL COMBUSTION CHAMBER STEP STRUCTURE AND ITS FABRICATION

BACKGROUND OF THE INVENTION

This invention relates to the structure of a liquid-fueled rocket engine, and, more particularly, to the structure of the combustion chamber and its manufacture, and the joining of the propellant injector and the combustion chamber.

A typical liquid-fueled rocket engine includes a cylindrically symmetric combustion chamber, with an injector attached to its injector end and a flared nozzle attached to its nozzle end. A liquid propellant including fuel and an oxidizer flows through injector ports in the injector and into the combustion chamber. The propellant is ignited in the combustion chamber. The hot gas resulting from the combustion expands through the nozzle and drives the rocket engine and the attached rocket structure in the direction opposite to that in which the nozzle is pointed.

The combustion chamber is cylindrically symmetric, but it is known to provide an outward step in the inner wall of the combustion chamber. That is, near the injector the inner surface of the wall of the combustion chamber has a first diameter, but at an axial location a portion of the distance from the injector to the nozzle there is an abrupt outward step in the inner surface of the wall to a second, greater diameter. The presence of this step promotes improved mixing and combustion of the fuel and the oxidizer, leading to improved performance of the rocket engine.

The wall of the combustion chamber is exposed to high temperature combustion gas during service. The wall is preferably made of a refractory material such as rhenium coated with iridium on the inwardly facing surface. The injector plate is much cooler in service, and is typically made of titanium. When the rocket engine is fired, there is a large temperature increase from room temperature and a large temperature gradient between the upper end of the combustion chamber and the adjacent injector, through the region where the two are attached.

It is conventional practice to attach the injector plate to the combustion chamber with a flange-and-bolt system or by welding. The flange-and-bolt system has the disadvantage that the mechanical seal is not well suited to withstand, without leaking, the high temperatures, large temperature change between room temperature and the service temperature, and large temperature gradients during service. Welding of the extremely dissimilar metals is difficult, and in particular it is quite difficult to achieve reliable welds of rhenium to titanium with available welding technology. The high temperatures on the combustion chamber side of the joint and the high temperature gradient through the joint can lead to a premature failure of the joint and a shortening of the life of the engine. Even a small pinhole in the joint can be disastrous, as it results in a back leak of hot combustion gases from the interior of the combustion chamber.

Recent advances in the design of the rocket engine to allow higher-temperature combustion and the use of more powerful propellants have resulted in even greater temperatures and temperature gradients. The existing stepped combustion chamber and combustion chamber/injector structures may be insufficient for operation in this environment. There is therefore a need for an improved approach to the manufacturing and structure of the combustion chamber, and for the attachment of the injector to the combustion chamber. The present invention fulfills this need, and further provides related advantages.

SUMMARY OF THE INVENTION

The present invention provides a rocket engine with an improved stepped combustion chamber structure and an approach for its manufacture. Also provided is an improved attachment between the injector and the combustion chamber. The rocket engine may be operated reliably at higher temperatures than possible with prior attachment procedures.

In accordance with the invention, a rocket engine comprises a combustion chamber having an annular wall with a chamber wall inner surface and a chamber wall outer surface. The annular wall includes a first axial region having a first inner diameter of the chamber wall inner surface, and a second axial region having a second inner diameter of the chamber wall inner surface. The second inner diameter is greater than the first inner diameter. An inner wall step transition is present between the first axial region and the second axial region. The rocket engine further includes an injector, and an attachment between the combustion chamber and the injector. The attachment comprises an annular metallic deposit bonded to the first axial region of the combustion chamber, an annular adaptor ring, a first weld joint between the adaptor ring and the metallic deposit, and a second joint between the adaptor ring and the injector.

The combustion chamber is preferably formed of a single piece of material, eliminating the need for some elements of detail structure required in other forms of the combustion chamber. This unitary construction is distinct from an alternative design for a step structure wherein the chamber wall is cylindrical of a constant diameter and the step is formed by a step collar insert within the combustion chamber. The present combustion chamber wall may be manufactured by any operable technique which permits the formation of a step in the wall, but chemical vapor deposition, plasma spraying, explosive forming, and sputtering are preferred approaches. In a preferred construction, the chamber wall is made of rhenium. At least a portion of the chamber wall inner surface may be coated with a layer of a material that provides enhanced resistance to the highly corrosive and erosive combustion gases. Such a coating material may be, for example, iridium or a ceramic.

The combustion chamber is joined to the injector by an attachment. The attachment preferably includes the annular metallic deposit bonded to the first axial region of the combustion chamber, the annular adaptor ring, and welds between the adaptor ring and the metallic deposit, and between the adaptor ring and the injector. The metallic deposit is preferably columbium, which is also known as niobium. (As used herein, a metal identified generically includes both the unalloyed metal and its alloys containing at least about 50 percent by weight of the pure metal. Thus, for example, as used herein unless otherwise stated, "columbium" includes both pure columbium and its alloys.) The metallic deposit is bonded to the combustion chamber wall by any operable technique, such as chemical vapor deposition, inertial welding, explosive cladding, or plasma spraying. Once this metallic deposit is in place, the annular adaptor ring is welded to the metallic deposit at one end, and to the injector at the other. The axial location of the combustion chamber, is established, in part, by the length of the adaptor ring, which allows the combustion chamber to be positioned for optimal performance. This axial positioning of the combustion chamber also allows the location of the bond joint between the metallic deposit and the combustion chamber to be positioned so as to maximize its performance, which typically is associated with minimizing differential thermal expansion and shock effects at the joint.

The present invention thus provides a rocket engine which has good efficiency of operation and specific impulse due to the presence of the internal step within the combustion chamber. It also has good reliability because of the integral construction of the combustion chamber, and the ability to position the bond joint between the metallic deposit and the combustion chamber at an optimal axial location. The rocket engine is readily manufactured by available techniques. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
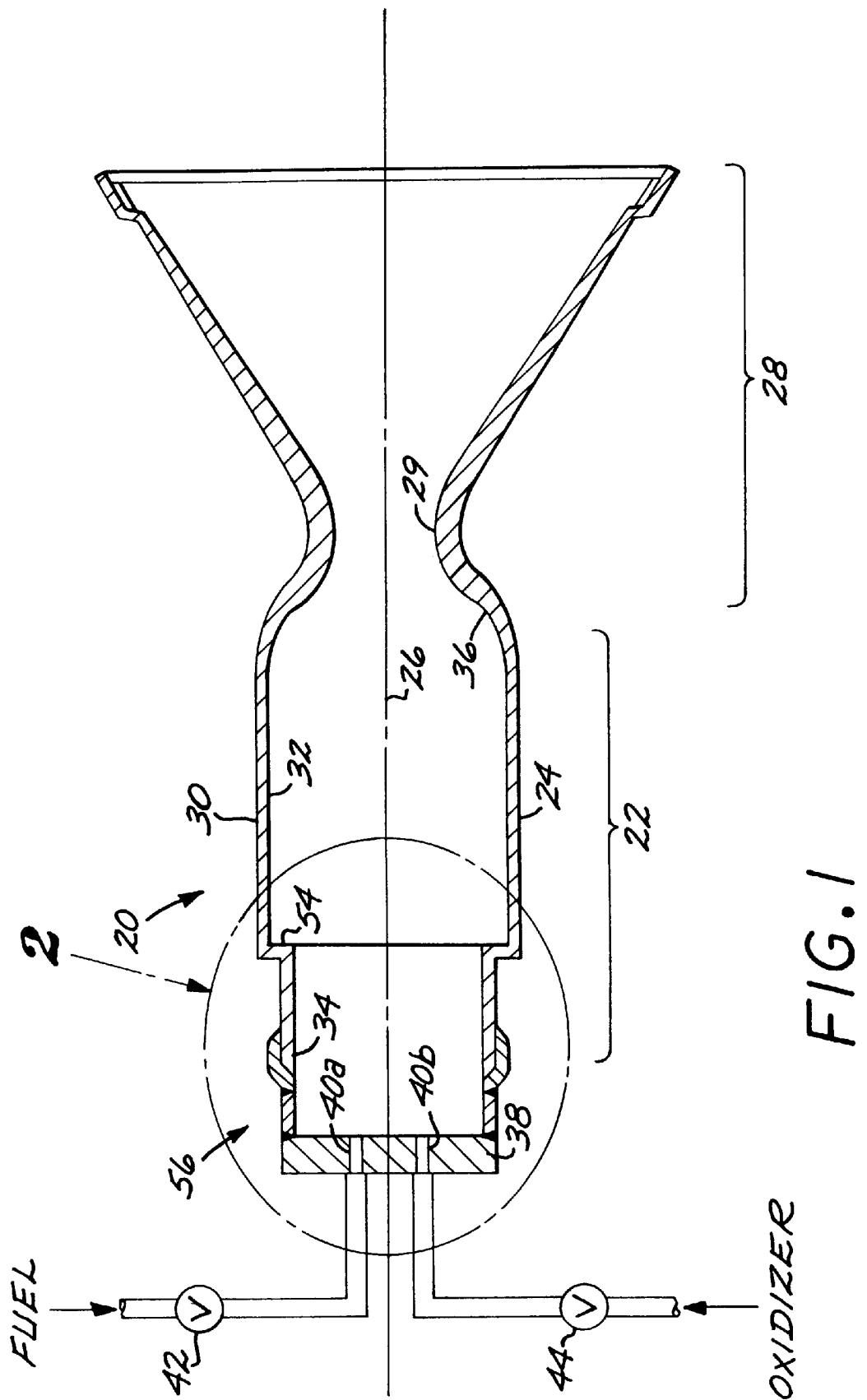
FIG. 1 is a sectional view of a rocket engine.
Figure 2:
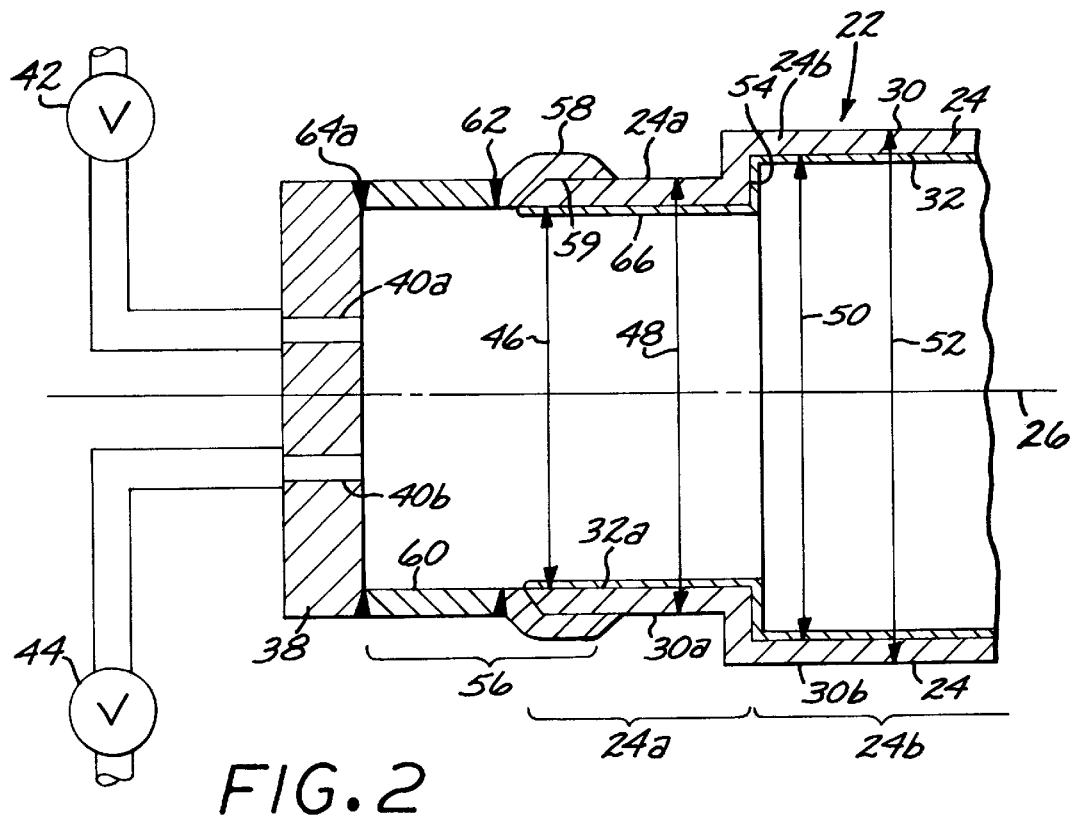
FIG. 2 is an enlarged detail of FIG. 1 in region 2—2, showing the injector and injector end of the combustion chamber.
Figure 3:
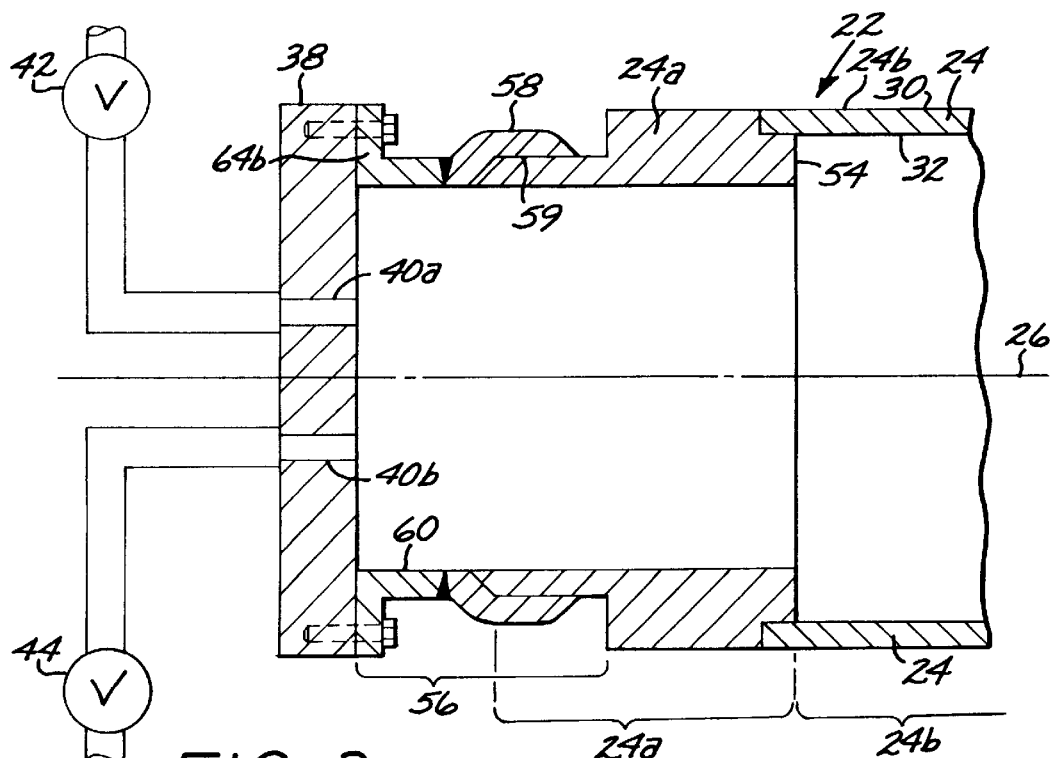
FIG. 3 is a second embodiment of the enlarged detail of FIG. 2.

FIG. 1 depicts a rocket engine 20, and FIGS. 2–3 show details of the rocket engine. The rocket engine 20 includes a combustion chamber 22 having a generally cylindrically symmetric annular wall 24 with a cylindrical axis 26, and an expansion nozzle 28. A narrowed throat region 29 is present within the expansion nozzle 28. The wall 24 and the expansion nozzle 28 may be fabricated separately and joined together, or they may instead be formed integrally. The cylindrical wall 24 has an outer cylindrical surface 30 and an inner cylindrical surface 32. The combustion chamber 22 has an injector end 34 and a nozzle end 36.

An injector 38 is attached to the injector end 34 of the combustion chamber 22. The injector 38 may be of any operable design, but is typically a plate having a plurality of injector ports 40 therein, of which only two are shown in FIG. 1. The propellant is provided to the combustion chamber 22 through the injector ports 40. Some of the injector ports 40a are supplied with a fuel through a fuel valve 42, and others of the injector ports 40b are supplied with an oxidizer through an oxidizer valve 44. The fuel and oxidizer flow through their respective injector ports 40 into the interior of the combustion chamber 22 and mix together. Where the mixture is hypergolic, as in the case of the preferred monomethyl hydrazine (fuel) and nitrogen tetraoxide/3 percent nitric oxide (oxidizer), the mixture ignites spontaneously. In other cases where the mixture does not spontaneously ignite, an ignitor (not shown) would be provided. The gaseous combustion products of the combustion expand rearwardly and outwardly through the nozzle 28 and drive the rocket engine 20, and the spacecraft to which it is attached, in the opposite direction.

The wall 24 of the combustion chamber 22 includes two regions shown in FIGS. 2–3, a first axial region 24a and a second axial region 24b. The first axial region 24a is closest to the injector 38, and the second axial region 24b is further from the injector 38 along the cylindrical axis 26 and closer to the expansion nozzle 28. The wall 24a of the first axial region has a first inner diameter 46 and a first outer diameter 48. The wall 24b of the second axial region has a second inner diameter 50 and a second outer diameter 52. The second inner diameter 50 is larger than the first inner diameter 46. The second outer diameter 52 may be larger than the first outer diameter 48, as in FIG. 2, or not. The two axial regions 24a and 24b may be of substantially the same wall thickness, as shown in the embodiment of FIG. 2, or the axial region 24a may be thicker than the axial region 24b, as shown in the embodiment of FIG. 3, to support higher internal pressures and/or greater launch loadings at the cost of slightly higher weight.

An abrupt, outwardly extending inner wall step transition 54 separates the first axial region 24a from the second axial transition 24b. The step transition 54 promotes thorough mixing and combustion of the fuel and the oxidizer introduced into the combustion chamber 22 through the injector 38. Preferably but not necessarily, the entire wall 24 of the combustion chamber 22 is a single, integral metallic piece, as distinct from other embodiments wherein the wall 24 and the step structure might be formed as two or more metallic pieces that are joined together through the structure of the rocket engine. By making the entire wall 24 of a single material, there is no differential thermal expansion in the wall between different materials, which could lead to thermal expansion strains and thermal shock. The absence of these effects improves the reliability of the wall and hence the engine.

An attachment 56 joins the combustion chamber 22 to the injector 38. The attachment 56 includes several elements and several joints. The attachment 56 must mechanically join the combustion chamber 22 and the injector 38 to bear the loads imposed during handling and service, during the large temperature changes and gradients which are experienced during service, and also to provide a seal against the leakage of hot gas at the injector end 34 of the combustion chamber 22.

The attachment 56 includes an annular metallic deposit 58 bonded in a metal-to-metal contact 59 to the first axial region 24a of the combustion chamber 22, preferably to an outer surface 30a of the first axial region 24a, at the injector end 34. The metallic deposit 58 is preferably about 0.110 inch thick (in the radial direction perpendicular to the cylindrical axis 26) at its thickest location and tapers toward the wall 24 with increasing distance from the injector 38.

The attachment 56 further includes an annular adaptor ring 60 joined to the metallic deposit 58 by a joint 62, which is most preferably a welded joint. The length of the adaptor ring 60 in the axial direction parallel to the axis 26 may be selected to position the metal-to-metal contact 59 of the metallic deposit 58 to the combustion chamber 22 at any desired location. FIG. 2 illustrates a relatively longer adaptor ring 60 that positions the contact 59 axially further from the injector 38, and FIG. 3 illustrates a relatively shorter adaptor ring 60 that positions the contact 59 axially closer to the injector 38. The axial location of the contact 59 may be important to the proper functioning of the engine 20, because the contact 59 is typically between dissimilar metals with different coefficients of thermal expansion, as will be described subsequently. The region of this contact 59 is therefore potentially susceptible to damage during testing and service due to differential thermal expansion and thermal shock effects. The use of the adaptor ring 60 of selectable length allows the designer of the engine to position the region of the contact 59 at an axial location where the potential damage to the engine will be minimal. Once the position of the contact 59 is established in this manner, the axial position of the step transition 54 is determined according to the length of the first axial region 24*a*. The exact positions of the contact 59 and the step transition 54 are selected according to the nature of the materials used to form the engine, the type of engine, the size of the engine, and the mission of the engine. The selection of these positions is not a part of the present invention, which instead provides engine designers the capability to establish the locations of the key elements of the engine.

The opposite end of the adaptor ring 60 is joined by a joint 64 to the injector 38. The joint 64 may be of any operable type. FIG. 2 illustrates a preferred embodiment wherein the joint 64*a* is a weld joint, and FIG. 3 illustrates an alternative embodiment wherein the joint 64*b* is a bolted flange joint.

In a preferred embodiment, the wall 24 of the combustion chamber 22 is made of rhenium, preferably unalloyed rhenium, with an optional 0.003–0.005 inch thick coating 66 on the inner cylindrical surface 32. The coating 66 is a material which withstands the erosion and corrosion of the hot combustion gas of the engine during service more effectively than does the material of the wall 24. Preferably, the coating 66, where used, is iridium or a ceramic. The coating 66 is applied by any operable technique for the selected coating material. For the preferred iridium coating, the coating 66 is preferably applied by plasma spraying, sputtering, or chemical vapor deposition. Areas that are not to be coated are masked during the coating operation. The metallic deposit 58 is preferably made of unalloyed columbium or C103 alloy having a composition of 10 weight percent hafnium, 1 weight percent titanium, balance columbium. The adaptor ring 60 is preferably made of columbium, most preferably C103 alloy having a composition of 10 weight percent hafnium, 1 weight percent titanium, balance columbium. The injector 38 is preferably made of titanium, most preferably an alloy of 6 weight percent aluminum, 4 weight percent vanadium, balance titanium. The titanium/columbium weld 64*a* between the injector 38 and the adaptor ring 60, and the columbium/columbium weld 62 between the adaptor ring 60 and the metallic deposit 58, are both readily accomplished by electron beam welding. Alternatively, as shown in FIG. 3, the joint 64*b* may be another type of joint such as a bolted joint.

The metallic deposit 58 is present to join the adaptor ring 60 to the wall 24 of the combustion chamber 22. The columbium adaptor ring 60 does not readily braze or weld directly to the relatively thin rhenium wall 24 of the combustion chamber 22 with the required strength and soundness. The metallic deposit 58 is first deposited onto the wall 24 with a metallurgical bond, and then the adaptor ring 60 is welded to the deposit 58.

Figure 4:
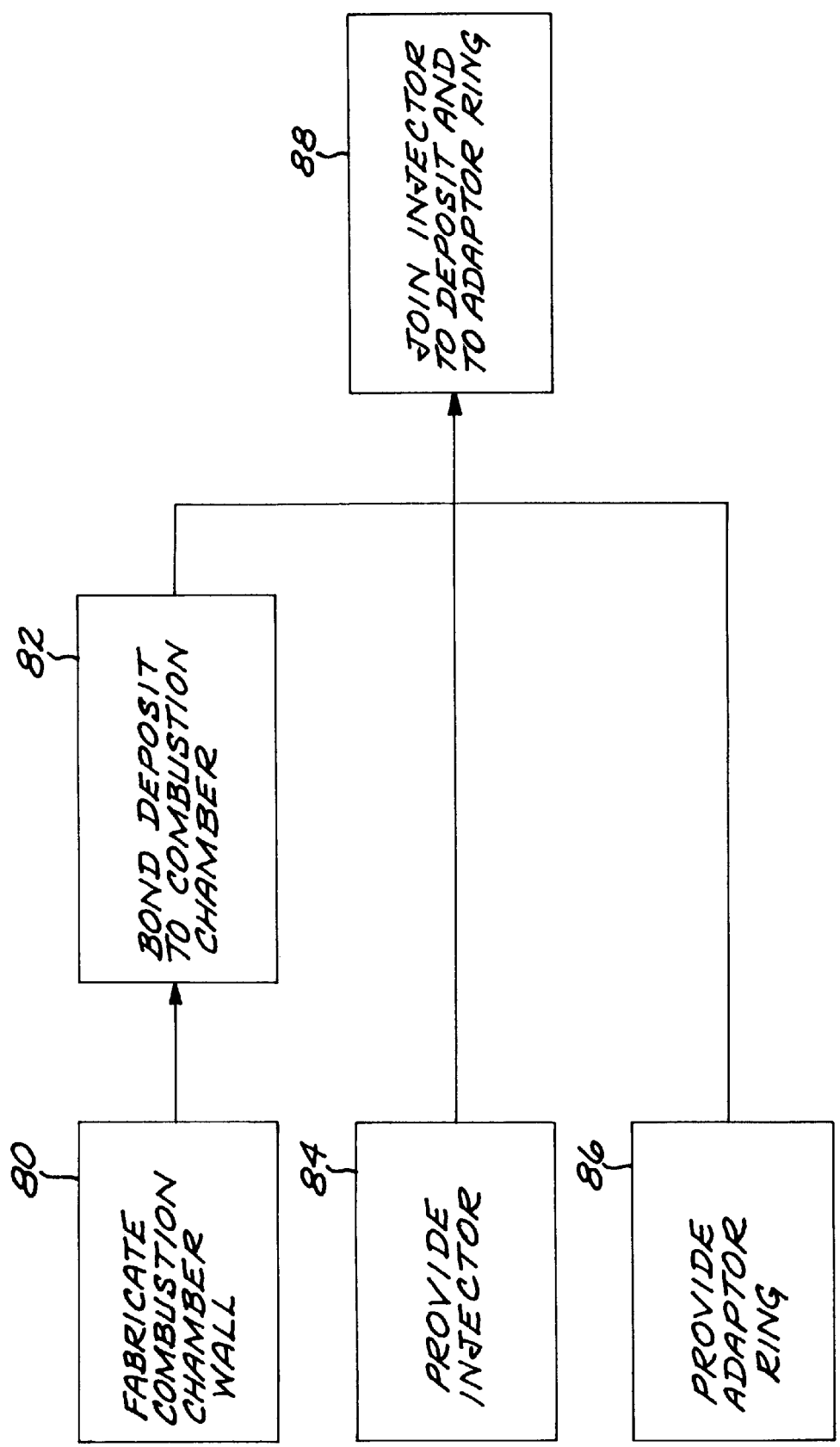
FIG. 4 is a block flow diagram of a method for constructing the rocket engine.

FIG. 4 illustrates the preferred approach to the fabrication of the rocket engine 20. The combustion chamber wall 24 is first fabricated, numeral 80. The wall 24 is preferably fabricated as a single piece of metal, with the step transition 54 formed integrally. The wall 24 may be fabricated by any operable technique, desirably a buildup technique where the wall is formed by depositing material until the desired shape and thickness are reached. The most preferred fabrication technique is chemical vapor deposition of the wall material, such as rhenium, onto a form defining the shape of the chamber. Alternative operable techniques include, but are not limited to, plasma spraying, explosive forming, and sputtering. All of these techniques are known in the art for other applications.

The material of the metallic deposit 58 is provided and bonded to the wall 24 of the combustion chamber 22, numeral 82, to form the metal-to-metal contact 59. Any operable bonding technique may be used. Welding and brazing are preferably not used, because it is difficult to obtain a sound bond and contact to rhenium by these techniques. Instead, the preferred technique is to deposit the metallic deposit 58 onto the wall 24, thereby establishing the metal-to-metal bond. The preferred deposition technique is chemical vapor deposition. Other operable techniques include, but are not limited, to, inertial welding, explosive cladding, and plasma spraying.

The injector 38 is provided, numeral 84, and the adaptor ring 60 is provided, numeral 86. The components are joined together, numeral 88. The adaptor ring 60 is joined to the metallic deposit 58 by any operable technique at the joint 62. The preferred approach is welding, most preferably electron beam welding, because the joint 62 is in or close to the hot zone of the combustion chamber. The adaptor ring 60 is joined to the injector by any operable technique at the joint 64. Because the joint 64 is at a lower temperature than the joint 62 during service, other types of joining techniques are operable. Welding by electron beam welding is preferred, as shown in FIG. 2, or, for example, a flange/bolt structure may be used, as shown in FIG. 3.

To complete the fabrication, the expansion nozzle 28 is attached to the combustion chamber 22, if the expansion nozzle was prepared as a separate component from the combustion chamber 22. The propellant lines are connected, and any other elements of the rocket engine, such as instrumentation probes, are attached.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rocket engine, comprising
   a combustion chamber comprising an annular wall with a chamber wall inner surface and a chamber wall outer surface, the annular wall including
     a first axial region having a first inner diameter of the chamber wall inner surface,
     a second axial region having a second inner diameter of the chamber wall inner surface, wherein the second inner diameter is greater than the first inner diameter, and
     an inner wall step transition between the first axial region and the second axial region;
   an injector; and
   an attachment between the combustion chamber and the injector, the attachment comprising:
     an annular metallic deposit bonded to the first axial region of the combustion chamber,
     an annular adaptor ring,
     a first weld joint between the adaptor ring and the metallic deposit, and
     a second joint between the adaptor ring and the injector.

2. The rocket engine of claim 1, further including a coating on at least a portion of the chamber wall inner surface.

3. The rocket engine of claim 2, wherein the coating comprises a material selected from the group consisting of iridium and a ceramic.

4. The rocket engine of claim 1, wherein the annular wall of the combustion chamber comprises rhenium.

5. The rocket engine of claim 1, wherein the injector comprises titanium.

6. The rocket engine of claim 1, wherein the annular metallic deposit comprises columbium.

7. The rocket engine of claim 1, wherein the annular adaptor ring comprises columbium.

8. The rocket engine of claim 1, wherein the combustion chamber is formed of a single piece of material.

9. The rocket engine of claim 1, wherein the second joint is a weld joint.

10. The rocket engine of claim 1, wherein the first axial region has a first outer diameter of the chamber wall outer surface, the second axial region has a second outer diameter of the chamber wall outer surface, wherein the second outer diameter is greater than the first outer diameter, and further including an outer wall step transition between the first axial region and the second axial region.

* * * * *